US011824158B2

(12) United States Patent
D'Angelo et al.

(10) Patent No.: US 11,824,158 B2
(45) Date of Patent: Nov. 21, 2023

(54) GEL ELECTROLYTE COMPOSITE INCLUDING IONIC LIQUID AND ZWITTERIONIC POLYMER SCAFFOLD

(71) Applicant: Trustees of Tufts College, Medford, MA (US)

(72) Inventors: Anthony J. D'Angelo, Medford, MA (US); Morgan Taylor, Medford, MA (US); Matthew Panzer, Somerville, MA (US); Huan Qin, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 193 days.

(21) Appl. No.: 16/754,046

(22) PCT Filed: Sep. 28, 2018

(86) PCT No.: PCT/US2018/053296
§ 371 (c)(1),
(2) Date: Apr. 6, 2020

(87) PCT Pub. No.: WO2019/070513
PCT Pub. Date: Apr. 11, 2019

(65) Prior Publication Data
US 2020/0328471 A1 Oct. 15, 2020

Related U.S. Application Data

(60) Provisional application No. 62/568,036, filed on Oct. 4, 2017.

(51) Int. Cl.
*H01M 10/0565* (2010.01)
*H01G 11/56* (2013.01)
(Continued)

(52) U.S. Cl.
CPC ........ *H01M 10/0565* (2013.01); *H01G 11/56* (2013.01); *H01M 10/0525* (2013.01);
(Continued)

(58) Field of Classification Search
CPC ......... H01M 10/0565; H01M 10/0525; H01M 10/36; H01G 11/56
(Continued)

(56) References Cited

U.S. PATENT DOCUMENTS

2003/0180625 A1  9/2003  Oh et al.
2011/0200848 A1*  8/2011  Chiang ................ H01M 8/188
                                                         429/105
(Continued)

FOREIGN PATENT DOCUMENTS

JP      2012054071 A  *  3/2012
WO   WO-2016/195916 A1   12/2016
WO   WO-2019/070513 A1    4/2019

OTHER PUBLICATIONS

Yoshizawa et al., Ion conduction in zwitterionic-type molten salts and their polymers, 2001, Journal of Materials Chemistry, 11, 1057-1062 (Year: 2001).*
(Continued)

Primary Examiner — Sean P Cullen
(74) Attorney, Agent, or Firm — Foley Hoag LLP

(57) ABSTRACT

A gel electrolyte composite containing a nonvolatile electrolyte and a zwitterionic polymer scaffold in which the non-volatile electrolyte is a non-lithium-containing ionic liquid, a sodium-containing ionic liquid, or a lithium-containing ionic liquid and the zwitterionic polymer scaffold is formed from one or more zwitterionic monomers only or both one or more zwitterionic monomers and one or more non-zwitterionic monomers. The zwitterionic polymer scaffold contains 8 mol % or higher of zwitterions relative to the
(Continued)

total content of the gel electrolyte composite when the nonvolatile electrolyte is a non-lithium-containing ionic liquid, and contains 1 mol % or higher of zwitterions relative to the total content of the gel electrolyte composite when the nonvolatile electrolyte is a sodium-containing ionic liquid or a lithium-containing ionic liquid. Also disclosed are a method of preparing the above-described gel electrolyte composite and an electrochemical energy storage device containing same.

18 Claims, 7 Drawing Sheets

(51) Int. Cl.
*H01M 10/0525* (2010.01)
*H01M 10/36* (2010.01)
(52) U.S. Cl.
CPC .... *H01M 10/36* (2013.01); *H01M 2300/0082* (2013.01); *H01M 2300/0085* (2013.01)
(58) Field of Classification Search
USPC .................................................. 429/303, 324
See application file for complete search history.

(56) References Cited

U.S. PATENT DOCUMENTS

| | | | | |
|---|---|---|---|---|
| 2014/0377621 | A1* | 12/2014 | Hanyu | H01M 50/409 429/102 |
| 2016/0028110 | A1* | 1/2016 | Yu | H01M 10/0565 429/303 |
| 2016/0064774 | A1* | 3/2016 | Lee | H01M 10/0569 429/199 |
| 2017/0015772 | A1* | 1/2017 | Watanabe | C08F 214/22 |
| 2017/0204211 | A1* | 7/2017 | Millichamp | C08F 2/48 |
| 2017/0207489 | A1 | 7/2017 | Zhamu et al. | |

OTHER PUBLICATIONS

Brown et al., Effect of Ionic Liquid on Mechanical Properties and Morphology of Zwitterionic Copolymer Membranes, Dec. 2009, Macromolecules, 43, 790-796 (Year: 2009).*
Lind et al., Zwitterion-Containing Ionogel Electrolytes, Nov. 2016, Chemistry of Materials, 28, 8480-8483 (Year: 2016).*
Sun et al., Mechanically strong ionogels formed by immobilizing ionic liquid in polyzwitterion networks, Oct. 2017, Journal of Molecular Liquids, 248, 759-766 (Year: 2017).*
Marzooq, Fatin. "Zwitterion-Containing Ionogel Electrolytes." Order No. 10165294 Tufts University, 2016. Ann Arbor: ProQuest. Web. Jun. 27, 2022. (Year: 2022).*
Ishii et al., Synthesis and Evaluation of Polybetaine-type Ion Gel Electrolytes, Sep. 22, 2017, Kobunshi Ronbunshu, 74, 542-548 (Year : 2017).*
International Search Report and Written Opinion for International Application No. PCT/US2018/053296 dated Dec. 6, 2018.
Lu et al., "Lithium-Containing Zwitterionic Poly(Ionic Liquid)s as Polymer Electrolytes for Lithium-Ion Batteries," The Journal of Physical Chemistry, 17756-17763, (2017).
Marzooq, "Zwitterion-Containing Lonogel Electrolytes," Tufts University, https://dl.tufts.edu/catalog/tufts:21253, (2016).

* cited by examiner

GEL ELECTROLYTE COMPOSITE INCLUDING IONIC LIQUID AND ZWITTERIONIC POLYMER SCAFFOLD

RELATED APPLICATIONS

This application is a National Stage of International Patent Applicant No. PCT/2018/053296, filed Sep. 28, 2018, which claims the benefit of priority to U.S. Provisional Application No. 62/568,036, filed Oct. 4, 2017.

GOVERNMENT SUPPORT

This invention was made with government support under grant number DE-SC0016423 awarded by the United States Department of Energy. The government has certain rights in the invention.

BACKGROUND

Gel electrolytes have attracted increasing attention because of their wide applications in the electrochemical industry, e.g., batteries and supercapacitors.

Traditionally, gel electrolyte composites contain a nanoparticle-based scaffold, a physically or chemically-cross-linked polymer network, or a salt-in-polymer blend. They have demonstrated various drawbacks, including poor mechanical integrity, low room-temperature ionic conductivity, and risk of high flammability.

There is a need to develop a new gel electrolyte composite that does not have the drawbacks mentioned above.

SUMMARY

An aspect of the present invention is a gel electrolyte composite containing a nonvolatile electrolyte and a zwitterionic polymer scaffold.

The nonvolatile electrolyte is a non-lithium-containing ionic liquid, a lithium-containing ionic liquid, or a sodium-containing ionic liquid. On the other hand, the zwitterionic polymer scaffold is formed from one or more zwitterionic monomers only or both one or more zwitterionic monomers and one or more non-zwitterionic monomers. Note that the zwitterionic polymer scaffold contains 8 mol % or higher of zwitterions relative to the total content of the gel electrolyte composite when the nonvolatile electrolyte is a non-lithium-containing ionic liquid, and contains 1 mol % or higher of zwitterions relative to the total content of the gel electrolyte composite when the nonvolatile electrolyte is a lithium-containing ionic liquid.

Typically, the non-lithium-containing ionic liquid contains a cation among N,N'-dialkylimidazolium, N,N-dialkylpyrrolidinium, alkylammonium, alkylphosphonium, and N-alkylpyridinium; and an anion among hexafluorophosphate, tetrafluoroborate, tetracyanoborate, tris((trifluoromethyl)sulfonyl)methide, trifluoroacetate, trifluoromethanesulfonate, bis((trifluoromethyl)sulfonyl)imide, bis(fluorosulfonyl)imide, thiocyanate, tosylate, nitrate, and tris(pentafluoroethyl)trifluorophosphate.

The lithium-containing ionic liquid can be either a lithium-based solvate ionic liquid formed from a lithium salt and an organic ligand or an ionic liquid formed from a lithium salt and a non-lithium-containing ionic liquid.

The ionic liquid can be a sodium-containing ionic liquid. For example, it can be a sodium-based solvate ionic liquid formed from a sodium salt and an organic ligand or an ionic liquid formed from a sodium salt and a non-sodium-containing ionic liquid.

In an exemplary gel electrolyte composite, the zwitterionic polymer scaffold is a copolymer scaffold formed from one or more zwitterionic monomers and one or more non-zwitterionic monomers.

Another exemplary gel electrolyte composite contains a zwitterionic polymer scaffold formed from one or more zwitterionic monomers only.

The zwitterionic monomers each can contain a cation among N,N'-dialkylimidazolium, N,N-dialkylpyrrolidinium, N-alkylpyridinium, and alkylammonium; and an anion among sulfonate, carboxylate, phosphate, phosphonate, and phosphinate. The zwitterionic monomers can be, e.g., sulfobetaine vinylimidazole, sulfobetaine methacrylate, and 2-methacryloyloxyethyl phosphorylcholine.

Generally, the nonvolatile electrolyte constitutes 1-99 vol % (e.g., 50-99 vol % and 60-95 vol %) of the gel electrolyte composite and the zwitterionic polymer scaffold constitutes 1-99 vol % (e.g., 1-50 vol % and 5-40 vol %) of the gel electrolyte composite.

Another aspect of this invention is an electrochemical energy storage device containing a gel electrolyte composite described above.

In the electrochemical energy storage device, the nonvolatile electrolyte constitutes 50-99 vol % of the gel electrolyte composite and the zwitterionic polymer scaffold constitutes 1-50 vol % of the gel electrolyte composite. Examples of the electrochemical energy storage device include, but are not limited to, a lithium-ion battery, a lithium metal battery, a sodium-ion battery, a sodium metal battery, and a supercapacitor.

A still further aspect of this invention is a method of preparing an above-described gel electrolyte composite. The method includes the following steps: providing an electrolyte solution that contains a nonvolatile electrolyte, adding one or more zwitterionic monomers to the electrolyte solution, polymerizing the one or more zwitterionic monomers via in situ free-radical polymerization to form a gel electrolyte composite, and collecting the gel electrolyte composite thus formed.

The details of the invention are set forth in the description below. Other features, objects, and advantages of the invention will be apparent from the following drawings and detailed description of several embodiments, and also from the appending claims.

DETAILED DESCRIPTION

Figure 1:
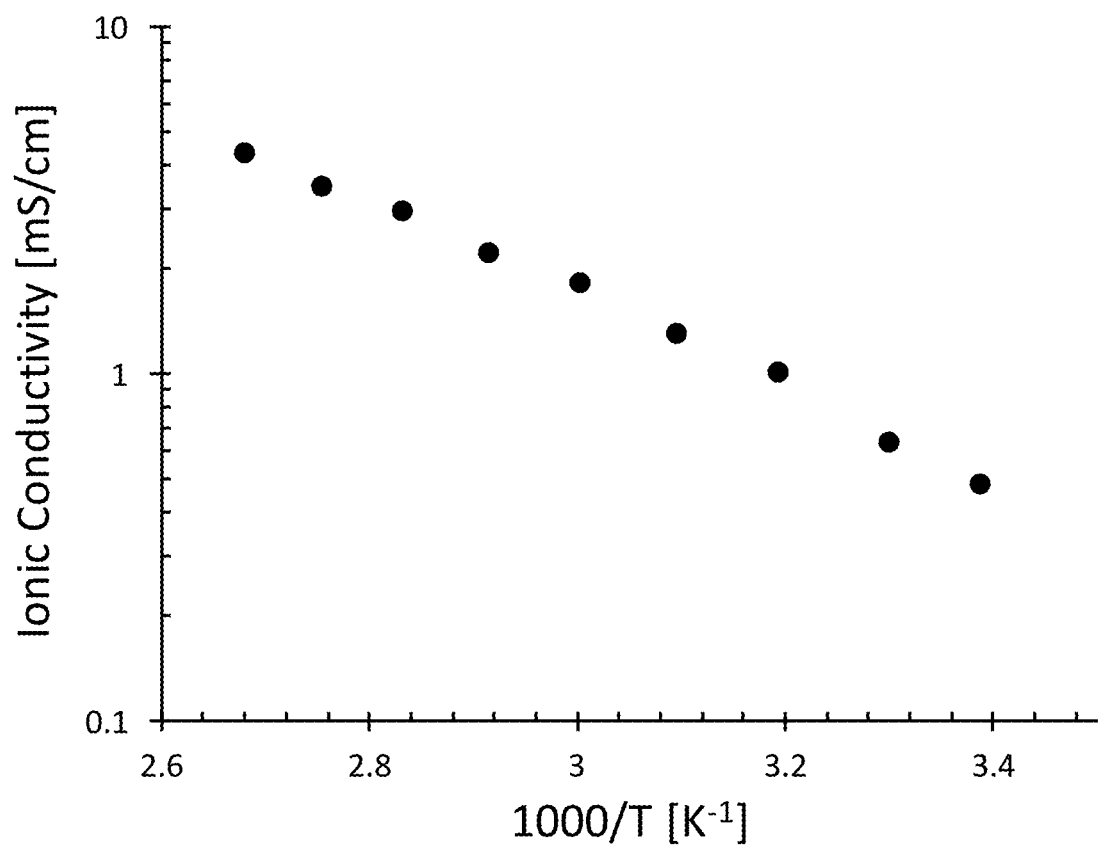
FIG. 1 is an Arrhenius plot of ionic conductivity versus temperature for a gel electrolyte composite formed from a lithium-based solvate ionic liquid and 9 vol % of sulfobetaine methacrylate (SBMA)/2-methacryloyloxyethyl phosphorylcholine (MPC).

Disclosed first in detail herein is a gel electrolyte composite that can be used to manufacture various electrochemical energy storage devices.

To reiterate, the gel electrolyte composite contains a nonvolatile electrolyte and a zwitterionic polymer scaffold, in which the nonvolatile electrolyte is a non-lithium-containing ionic liquid, a lithium-containing ionic liquid, or a sodium-containing ionic liquid.

The zwitterionic polymer scaffold is formed from one or more zwitterionic monomers only or both one or more zwitterionic monomers and one or more non-zwitterionic monomers. Of note, the zwitterionic polymer scaffold contains 8 mol % or higher of zwitterions relative to the total content of the gel electrolyte composite when the nonvolatile electrolyte is a non-lithium-containing ionic liquid, and contains 1 mol % or higher of zwitterions relative to the total content of the gel electrolyte composite when the nonvolatile electrolyte is a lithium-containing ionic liquid.

The non-lithium-containing ionic liquid contains a cation and an anion. Examples of the cation include, but are not limited to, N,N'-dialkylimidazolium, N,N-dialkylpyrrolidinium, alkylammonium, alkylphosphonium, and N-alkylpyridinium. Examples of the anion include, but are not limited to, hexafluorophosphate, tetrafluoroborate, tetracyanoborate, tris((trifluoromethyl)sulfonyl)methide, trifluoroacetate, trifluoromethanesulfonate, bis((trifluoromethyl)sulfonyl)imide, bis(fluorosulfonyl)imide ("FSI"), thiocyanate, tosylate, nitrate, and tris(pentafluoroethyl)trifluorophosphate. An exemplary non-lithium-containing ionic liquid is formed from a cation of 1-ethyl-3-methylimidazolium ("EMI") and an anion of bis(trifluoromethylsulfonyl)imide ("TFSI"), resulting in EMI-TFSI as the ionic liquid. Additional examples of the non-lithium-containing ionic liquid are N-methyl-N-butylpyrrolidinium ("BMP")-TFSI and N-methyl-N-propylpyrrolidinium ("PMP")-FSI.

The lithium-containing ionic liquid typically is either a lithium-based solvate ionic liquid formed from a lithium salt and an organic ligand or an ionic liquid formed from a lithium salt and a non-lithium-containing ionic liquid. A lithium salt refers to a salt formed from lithium cation and an anion, in which the anion can be hexafluorophosphate, tetrafluoroborate, tetracyanoborate, tris((trifluoromethyl) sulfonyl)methide, trifluoroacetate, trifluoromethanesulfonate, bis((trifluoromethyl)sulfonyl)imide, bis(fluorosulfonyl)imide, thiocyanate, tosylate, nitrate, or tris(pentafluoroethyl)trifluorophosphate. An exemplary lithium salt is Li-TFSI. An organic ligand can be an organic molecule that binds to a metal atom to form a metal complex. An exemplary organic ligand is tetra(ethylene glycol) dimethyl ether, i.e., tetraglyme ("G4"). The lithium-containing ionic liquid can be a lithium-based solvate ionic liquid formed from Li-TFSI and G4, i.e., the ionic liquid being Li(G4)-TFSI. Alternatively, it can be an ionic liquid formed from Li-TFSI and a non-lithium-containing ionic liquid, in which the non-lithium-containing ionic liquid is EMI-TFSI.

Moreover, the ionic liquid can be a sodium-containing ionic liquid. It can be either a sodium-based solvate ionic liquid formed from a sodium salt and an organic ligand or an ionic liquid formed from a sodium salt and a non-sodium-containing ionic liquid. The non-sodium-containing ionic liquid is free of lithium.

A sodium salt refers to a salt formed from sodium cation and an anion. The anion can be, but is not limited, to hexafluorophosphate, tetrafluoroborate, tetracyanoborate, tris((trifluoromethyl)sulfonyl)methide, trifluoroacetate, trifluoromethanesulfonate, TFSI, FSI, thiocyanate, tosylate, nitrate, or tris(pentafluoroethyl)trifluorophosphate. Exemplary sodium salts are Na-TFSI and Na-FSI.

The sodium salts described above can be used in conjunction with an organic ligand to form a sodium-based solvate ionic liquid. For example, the organic ligand penta (ethylene glycol) dimethyl ether, i.e., pentaglyme ("G5"), can be used together with the sodium salt Na-TFSI to form the ionic liquid Na(G5)-TFSI.

Alternatively, an ionic liquid can be prepared from the sodium salts by combining them with a non-sodium-containing ionic liquid. An exemplary ionic liquid can be formed from Na-TFSI and BMP-TFSI. Another example is formed from Na-FSI and PMP-FSI.

In one embodiment of the gel electrolyte composite, the nonvolatile electrolyte is a non-lithium-containing ionic liquid and the zwitterionic polymer scaffold contains 8 mol % or higher of zwitterions relative to the total content of the gel electrolyte composite. In this embodiment, the zwitterionic polymer scaffold can be a copolymer scaffold formed from one or more zwitterionic monomers and one or more non-zwitterionic monomers. It can also be formed from one or more zwitterionic monomers only.

In another embodiment of the gel electrolyte composite, the nonvolatile electrolyte is a lithium-containing ionic liquid and the zwitterionic polymer scaffold contains 1 mol % or higher (e.g., 5 mol % or higher, 10 mol % or higher, and 20 mol % or higher) of zwitterions relative to the total content of the gel electrolyte composite. Similarly, in this embodiment, the zwitterionic polymer scaffold can be a copolymer scaffold formed from one or more zwitterionic monomers and one or more non-zwitterionic monomers or it can be a polymer scaffold formed from one or more zwitterionic monomers only.

The gel electrolyte composite can also be lithium-free, including instead a sodium-containing ionic liquid and a zwitterionic polymer scaffold containing 1 mol % or higher (e.g., 5 mol % or higher, 10 mol % or higher, and 20 mol % or higher) of zwitterions relative to the total content of the gel electrolyte composite.

Turning to the zwitterionic polymer scaffold, it can be formed from both one or more zwitterionic monomers and one or more non-zwitterionic monomers or formed from one or more zwitterionic monomers only. Note that a zwitterionic compound is defined as a neutral molecule containing separate positively and negatively charged groups.

Each of the zwitterionic monomers or non-zwitterionic monomers typically contains a polymerizable moiety, such as acrylate, methacrylate, and a terminal vinyl group (e.g., vinylsulfonate and vinylimidazole). In addition, the zwitterionic monomers each contain a cation and an anion. Examples of the cation include N,N'-dialkylimidazolium, N,N-dialkylpyrrolidinium, N-alkylpyridinium, and alkylammonium. Examples of the anion include sulfonate, carboxylate, phosphate, phosphonate, and phosphinate. An exemplary zwitterionic monomer is sulfobetaine vinylimidazole (SBVI), sulfobetaine methacrylate (SBMA), carboxybetaine methacrylate (CBMA), or 2-methacryloyloxyethyl phosphorylcholine (MPC). Notably, a zwitterionic monomer, e.g., SBMA, can also be mixed with another zwitterionic monomer, e.g., MPC, in a pre-determined ratio (e.g., 1:1 to 1:10 molar ratio) to form a zwitterionic polymer scaffold.

The gel electrolyte composite set forth above typically contains a nonvolatile electrolyte in an amount of 1-99 vol % relative to the total content, preferably 50-99 vol % and, more preferably, 60-95 vol %. It also contains a zwitterionic polymer scaffold in an amount of 1-99 vol % relative to the total content, preferably 1-50 vol % and, more preferably, 5-40 vol %.

Further covered by this invention is an electrochemical energy storage device containing a gel electrolyte composite described above, in which the nonvolatile electrolyte constitutes 50-99 vol % of the gel electrolyte composite and the zwitterionic polymer scaffold constitutes 1-50 vol % of the gel electrolyte composite. Exemplary electrochemical energy storage devices include, but are not limited to, a lithium-ion battery, a lithium metal battery, a sodium-ion battery, and a supercapacitor.

Still within the scope of this invention is a method of preparing an above-described gel electrolyte composite.

The method includes four steps, namely, (i) providing an electrolyte solution that contains a nonvolatile electrolyte, (ii) adding one or more zwitterionic monomers to the electrolyte solution, (iii) polymerizing the one or more zwitterionic monomers via in situ free-radical polymerization to form a gel electrolyte composite, and (iv) collecting the gel electrolyte composite thus formed.

More specifically, the gel electrolyte composite is prepared via in situ free-radical polymerization, in the presence of a UV-inducible free radical generator, of one or more monomers contained in an electrolyte solution having a nonvolatile electrolyte. The free-radical polymerization is typically performed via exposure to a UV lamp for a period of time (e.g., 10 minutes). It can also be carried out under a thermal condition, e.g., heating, in the presence of a thermo-inducible free radical generator. The gel electrolyte composite thus prepared contains a zwitterionic polymer scaffold that can be cross-linked via chemical interaction (e.g., covalent bonding) or physical interaction (e.g., dipole-dipole and entanglement) between zwitterionic moieties.

In a gel electrolyte composite of this invention, the zwitterionic polymer scaffold provides physical support and dimensional stability to the nonvolatile electrolyte, thereby creating a gel electrolyte consisting of a three-dimensional polymer network that spans the volume of the composite. The zwitterionic polymer scaffold can also chemically interact with the nonvolatile electrolyte via its various chemical functional groups, e.g., zwitterionic and non-zwitterionic moieties. The unique physical and chemical relationship between the nonvolatile electrolyte and the zwitterionic polymer scaffold results in a gel electrolyte composite that displays viscoelastic behavior.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. The publication cited herein is incorporated by reference in its entirety.

Provided below are methods used for preparing, characterizing, and analyzing the gel electrolyte composites of this invention, which are described in the examples that follow.

Preparation of Gel Electrolyte Composites

The gel electrolyte composites used in the following examples were prepared according to the protocols reported in Lind et al., *Chem. Mater.*, 2016, 28, 8480-8483.

More specifically, polymer-supported gel electrolyte precursor solutions were prepared by mixing a pre-determined quantity of monomers with a nonvolatile electrolyte and stirred for 15 minutes. Approximately 2 wt % photoinitiator was added to each gel electrolyte precursor solution. Polymerization of the precursor solution was performed via UV irradiation at 365 nm in situ within a mold for 10 minutes. Gel formation was verified by visibly ensuring that no flow was observed when turning the vial containing each UV-cured precursor solution upside down.

Ionic Conductivity

Ionic conductivity values for the gel electrolyte composites thus prepared were determined via measuring AC impedance spectroscopy performed on gel samples fabricated in a custom-built test cell using a potentiostat with a built-in frequency response analyzer. Room temperature AC impedance spectroscopy measurements were performed inside a nitrogen-filled glovebox over the frequency range of 1 Hz to 100 kHz using a sinusoidal voltage amplitude of 10 mV (0 V DC offset). Variable temperature impedance spectroscopy measurements were performed by placing gel electrolyte composites on top of a temperature-controlled microscopy stage with two thin electrical probes inserted directly into a cylindrical gel electrolyte sample (diameter=6.35 mm, thickness=3.16 mm), using a probe spacing of approximately 4 mm. A 15 min holding period was utilized in between each temperature step change to allow for thermal equilibration of the sample. Ionic conductivity values for the temperature-dependent measurements were calculated using a geometrical correction factor for each sample that equated the conductivity of the gel electrolyte composites at room temperature with that measured using parallel indium tin oxide electrodes.

Thermal Stability

Mechanical characterization was performed by compression testing in a free-extension mode using a dynamic mechanical analyzer. The compression rate used in test was 0.01 mm/s, from 0% to 10% strain. Each cylindrical gel electrolyte sample possessed a diameter:thickness ratio of approximately 2:1. Elastic modulus values were calculated as the slope of a best-fit line to the resulting stress-strain data in the 0-10% strain regime. Thermal stability measurements were recorded with a thermogravimetric analyzer purged with $N_2$ gas at a heating rate of 5° C./min. Linear sweep voltammetry measurements were recorded using a potentiostat and a Teflon-lined cell having the configuration: stainless steel (working electrode)/gel electrolyte/Li metal inside an argon-filled glove box at a scan rate of 1 mV/s.

Example 1

Gel Electrolyte Composites Formed from a Lithium-Based Solvate Ionic Liquid

The preparation method described above was followed to produce gel electrolyte composites using a lithium-based solvate ionic liquid, i.e., Li(G4)-TFSI. These gel electrolyte composites are termed as solvate gel electrolyte composites.

Shown in Table 1 below are the compositions of the four gel electrolyte composites thus prepared and their room-temperature ionic conductivities and elastic modulus.

Of note, these gel electrolyte composites each contain a zwitterionic polymer scaffold formed of one or more zwitterionic monomers only, i.e., SBVI, SBMA, MPC, and SBMA/MPC (1:5 mol ratio).

TABLE 1

[Li(G4)][TFSI]-based gel electrolyte composites

| Zwitterion | Vol % Polymer | Ionic Conductivity [mS/cm] | Elastic Modulus [kPa] | Strain [%] | Flexible? |
|---|---|---|---|---|---|
| SBVI | 11.6 | 0.54 | 1,477 | — | No |
| SBMA | 8.5 | 0.58 | 2,440 | — | No |
| MPC | 8.2 | 0.31 | 13 | ~100 | Yes |
| SBMA/MPC (1:5 mol) | 9.0 | 0.48 | 489 | — | Yes |

As demonstrated in Table 1, the four gel electrolyte composites having various amounts of polymer scaffolds all exhibited similar room-temperature ionic conductivities while displaying very different elastic properties. More specifically, these gel electrolyte composites, formed from zwitterionic monomers of SBVI, SBMA, MPC, and SBMA/MPC (1:5 mol ratio), contained polymeric scaffolds in amounts of 11.6 vol %, 8.5 vol %, 8.2 vol %, and 9.0 vol %, respectively, and unexpectedly exhibited room-temperature ionic conductivities of 0.54, 0.58, 0.31, and 0.48 mS/cm, respectively, and elastic modulus values of 1477, 2440, 13, and 489 kPa, respectively. Note that mechanical measurement of elastic modulus values indicates the tunable property of a gel electrolyte composite. Unexpectedly, gel electrolyte composites formed from SBVI and SBMA demonstrated highly tunable properties with elastic modulus values of 1477 and 2440 kPa, respectively.

A study was performed to evaluate the flexible tensile property of gel electrolyte composites with various amounts of MPC. Composite specimens having a size of 1 cm×4 cm and formed from as high as 8 vol % of MPC exhibited flexible tensile properties under up to 100% strain without showing composite damages.

In addition, gel electrolyte composites were also fabricated using both MPC and either SBMA or SBVI to evaluate their flexibility and stiffness. Unexpectedly, a stiff gel electrolyte composite, fabricated from SBVI/MPC (1:1 mol ratio) with a high polymer scaffold content of 18 wt % (approximately 33 vol %), exhibited an elastic modulus value of 8000 kPa. On the other hand, a gel electrolyte composite, formed from SBMA/MPC (1:5 mol ratio), demonstrated a stiff compressive elastic modulus value of 489 kPa while also exhibiting a flexible nature.

Measurements of room-temperature ionic conductivity showed that gel electrolyte composites formed from Li(G4)-TFSI had ionic conductivities ranging from 0.3 to 0.9 mS/cm. Indeed, as shown in Table 1, the above-described four composites exhibited room-temperature ionic conductivities of 0.31, 0.48, 0.54, and 0.58 mS/cm.

FIG. 1 shows the temperature-dependent measurements of ionic conductivity recorded for a gel electrolyte composite formed from 9 vol % SBMA/MPC (1:5 mol ratio) immobilizing Li(G4)-TFSI. Electrochemical impedance spectroscopy measurements verified stable performance of the gel electrolyte composite from 23° C. to 100° C., in which the ionic conductivities increased from 0.48 to 4.33 mS/cm.

Figure 2:
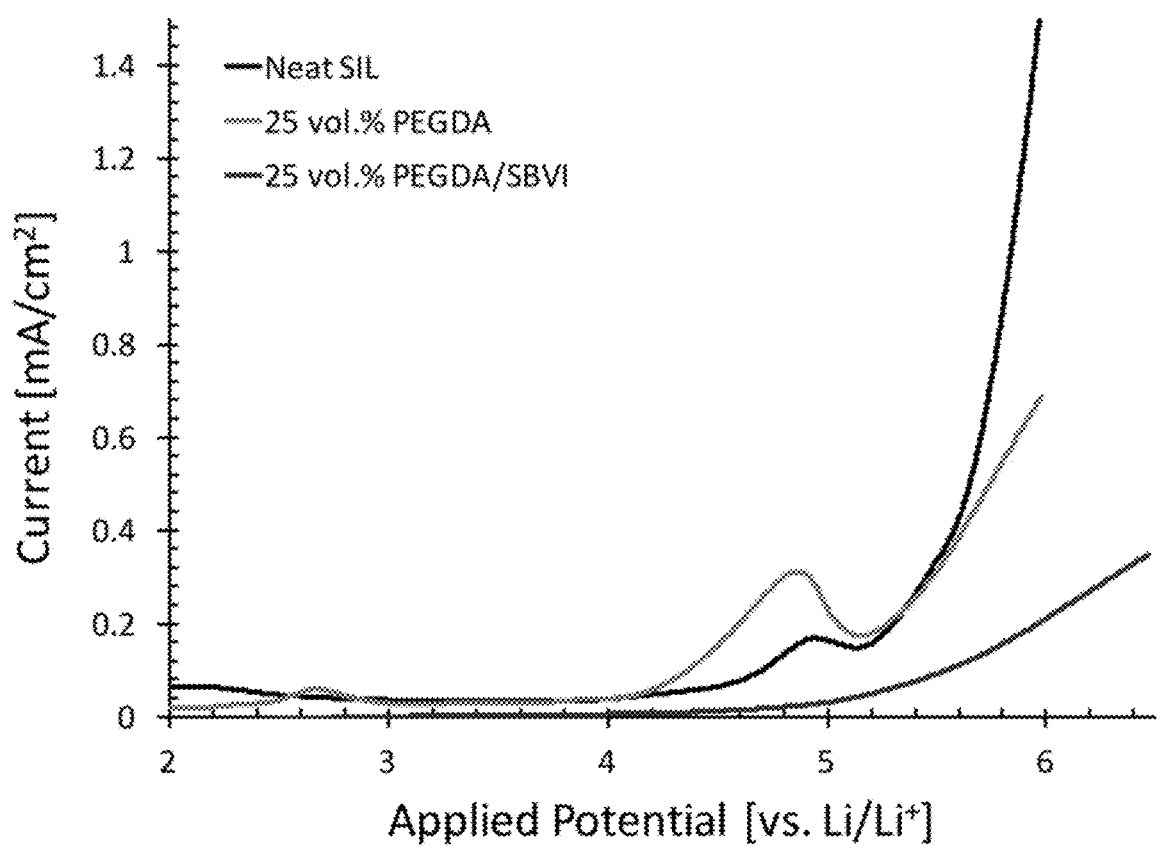
FIG. 2 is a plot of current versus applied potential measured by linear sweep voltammetry at a rate of 1 mV/s for a neat lithium-based solvate ionic liquid (SIL) electrolyte, a gel electrolyte composite formed from the SIL and 25 vol % of poly(ethylene glycol) diacrylate (PEGDA), and a gel electrolyte composite formed from the SIL and 25 vol % of sulfobetaine vinylimidazole (SBVI)/PEGDA (1:9 mol ratio). Anodic stability was tested in which 4.8V is required for lithium metal-based battery operation. A current density benchmark of 0.2 mA/cm$^2$ was assigned to designate the point at which the electrolyte is no longer considered to be stable.

FIG. 2 demonstrates that electrochemical stability of a gel electrolyte composite, formed from Li(G4)-TFSI and a poly(ethylene glycol) diacrylate (PEGDA)/SBVI-based polymeric scaffold, exhibited stability up to about 6V in a lithium metal cell, in which 4.8V was the benchmark for viable electrolytes. This zwitterion-containing gel electrolyte composite unexpectedly demonstrated increased stability, as compared to its composite counterpart formed from PEGDA only not containing zwitterions.

Figure 3:
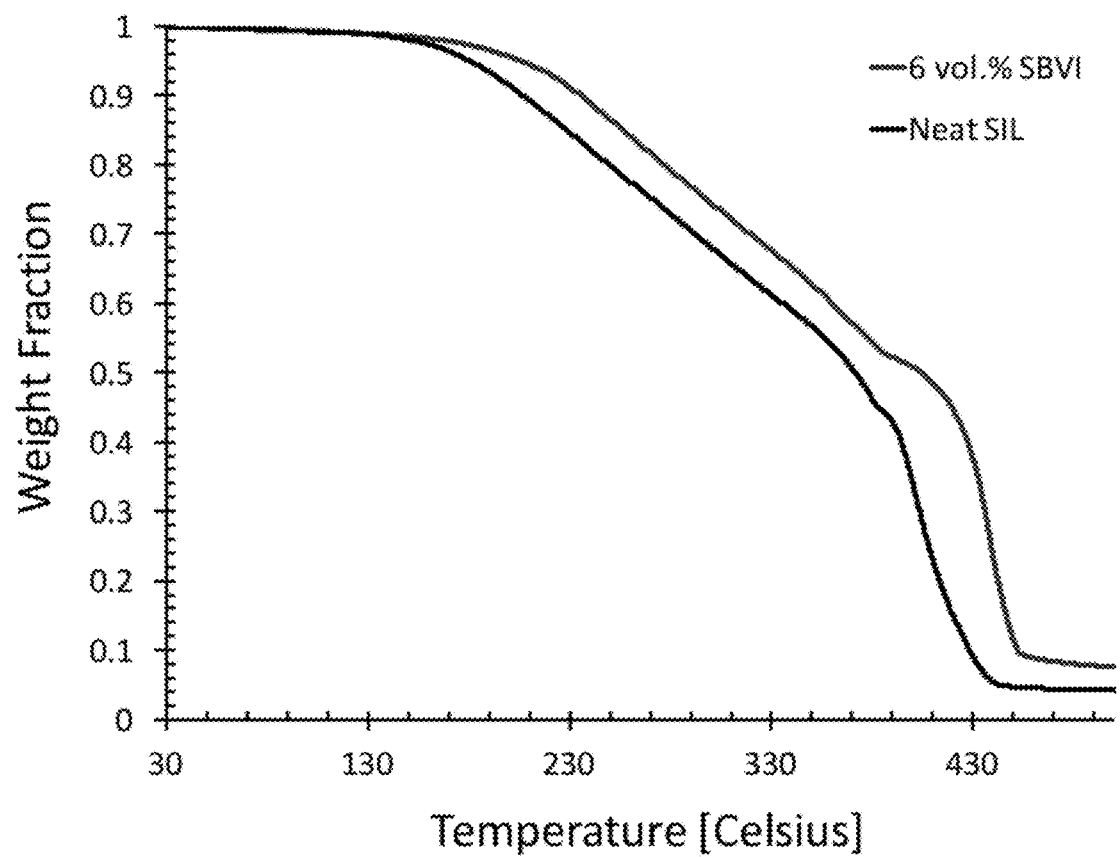
FIG. 3 is a plot of thermogravimetric analysis data measured at a heating rate of 5° C./min to compare a neat SIL electrolyte with a gel electrolyte composite formed from 6 vol % of SBVI.

As shown in FIG. 3, thermal stability tests revealed that a solvate gel electrolyte composite formed from SBVI exhibited stability performance better than or close to that formed from a neat liquid electrolyte without containing zwitterions. It was observed that the solvate gel electrolyte composite demonstrated only a 5 wt % loss at about 180° C.

Self-healing ability of a gel electrolyte composite is beneficial in the event of a rupture of the gel. A study was performed to evaluate the self-healing property of a solvate gel electrolyte composite formed from 9 vol % SBMA/MPC (1:5 mol ratio). It was observed that the solvate gel electrolyte composite, having an elastic modulus value of 489 kPa, fully healed after being cut in half and heated at 60° C. overnight.

These results indicate that a gel electrolyte composite of this invention provides a stiff and mechanically robust gel electrolyte with capability of self-healing.

Example 2

Gel Electrolyte Composites Formed from a Lithium Salt and a Non-Lithium-Containing Ionic Liquid The preparation method described above was followed to produce gel electrolyte composites using a lithium salt, e.g., LiTFSI, and a non-lithium-containing ionic liquid, e.g., EMI-TFSI. These gel electrolyte composites contained a zwitterionic polymeric scaffold formed from one or more zwitterionic monomers only, e.g., SBVI:MPC (1:3 mol ratio).

Room-temperature ionic conductivities and elastic moduli were measured for SBVI:MPC zwitterionic polymeric scaffolds having varying polymer contents. The results are shown below in Table 2.

TABLE 2

Properties of SBVI:MPC zwitterionic polymeric scaffolds formed with a Li salt

| wt % copolymer | RT ionic conductivity (mS/cm) | Elastic modulus (kPa) |
|---|---|---|
| 2.2 | 4.4 | 7 |
| 3.5 | 4.2 | 56 |

TABLE 2-continued

Properties of SBVI:MPC zwitterionic polymeric scaffolds formed with a Li salt

| wt % copolymer | RT ionic conductivity (mS/cm) | Elastic modulus (kPa) |
|---|---|---|
| 5.0 | 4.1 | 261 |
| 7.0 | 4.0 | 1082 |
| 9.1 | 3.8 | 2166 |
| 11 | 3.8 | 4878 |
| 13 | 3.4 | 8575 |

The results showed that the elastic modulus values of these gel electrolyte composites was tuneable in a wide range from about 7 kPa to about 8500 kPa, by adjusting the wt % of copolymer present. Unexpectedly, the same composites exhibited room-temperature ionic conductivities only in a range from 3.4 to 4.4 mS/cm. Of note, the ionic conductivity of neat LiTFSI/EMI-TFSI (1M) liquid electrolyte without zwitterions was measured to be about 4.0 mS/cm.

These results demonstrate that a gel electrolyte composite containing a zwitterionic polymer scaffold has a highly conductive network that can have a modulus value of greater than 1000 kPa while displaying a minimal change in ionic conductivity.

Figure 4:
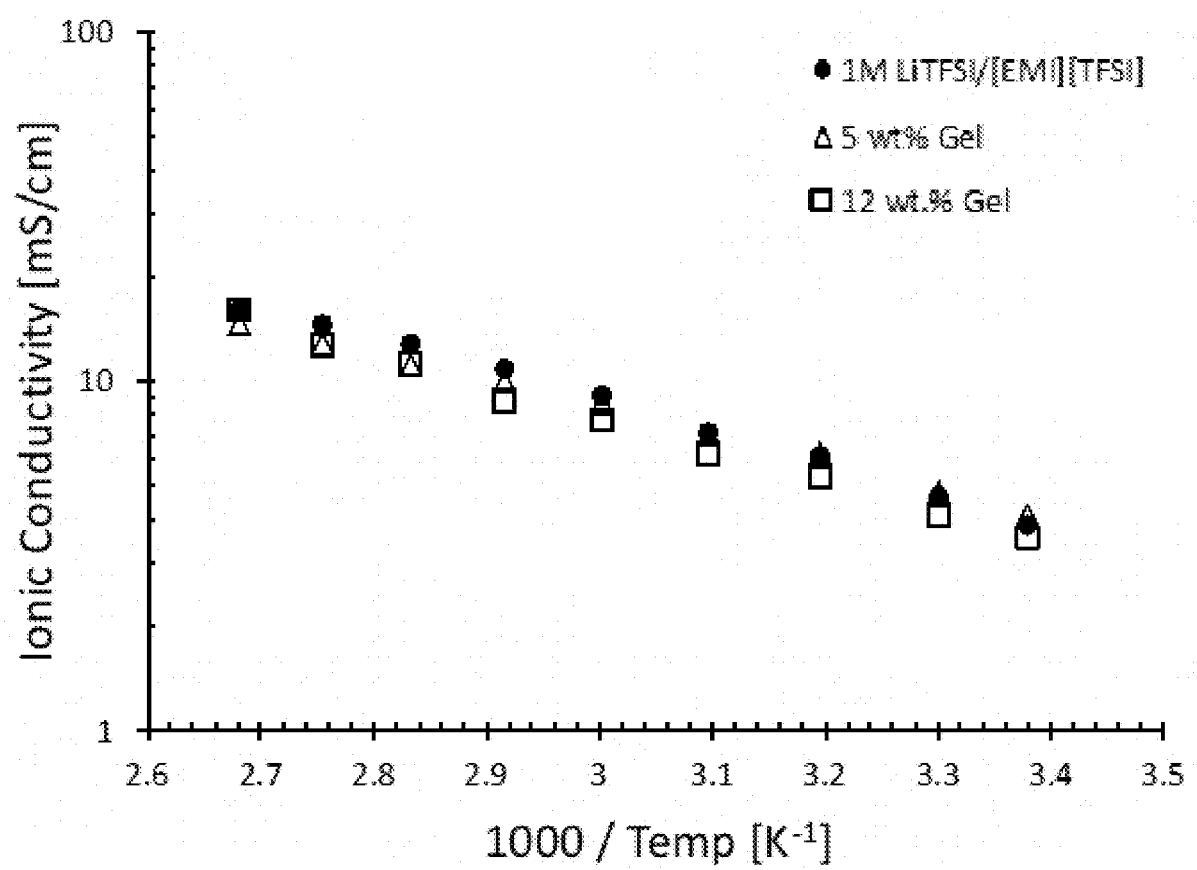
FIG. 4 is an Arrhenius plot of ionic conductivity versus temperature for two gel electrolyte composites formed from zwitterionic monomers of SBVI/MPC (1:3 mol ratio) and containing 6.6 mol % (or 5 wt %) and 16 mol % (or 12 wt %) of zwitterions relative to the total content of each gel electrolyte composite, and neat Li bis(trifluoromethylsulfonyl)imide (TFSI)/1-ethyl-3-methylimidazolium (EMI)-TFSI (1 M) liquid electrolyte.

The temperature-dependent ionic conductivity over temperatures from 23° C. to 100° C. was measured for two gel electrolyte composites containing 6.6 mol % (or 5 wt %) and 16 mol % (or 12 wt %) of zwitterions relative to the total content of each gel electrolyte composite and of neat LiTFSI/EMI-TFSI (1 M) liquid electrolyte without zwitterions. The two gel electrolyte composites containing 5 wt % and 12 wt % of zwitterions exhibited elastic modulus values of 261 kPa and 8500 kPa, respectively. As shown in FIG. 4, at all tested temperatures, the two zwitterion-containing gel electrolyte composites exhibited ionic conductivities comparable to those of the neat liquid electrolyte not containing zwitterions. Notably, in practical applications, ionic conductivity is a critical parameter affecting the discharge performance of a Li-based battery and must maintain adequate performance at temperatures up to 100° C. At higher discharge rates (e.g. 1 C, 1 hour discharge), the mobility of Li-ions, indicated by the ionic conductivity, strongly affects the resultant capacity of the Li-based battery.

Figure 5:
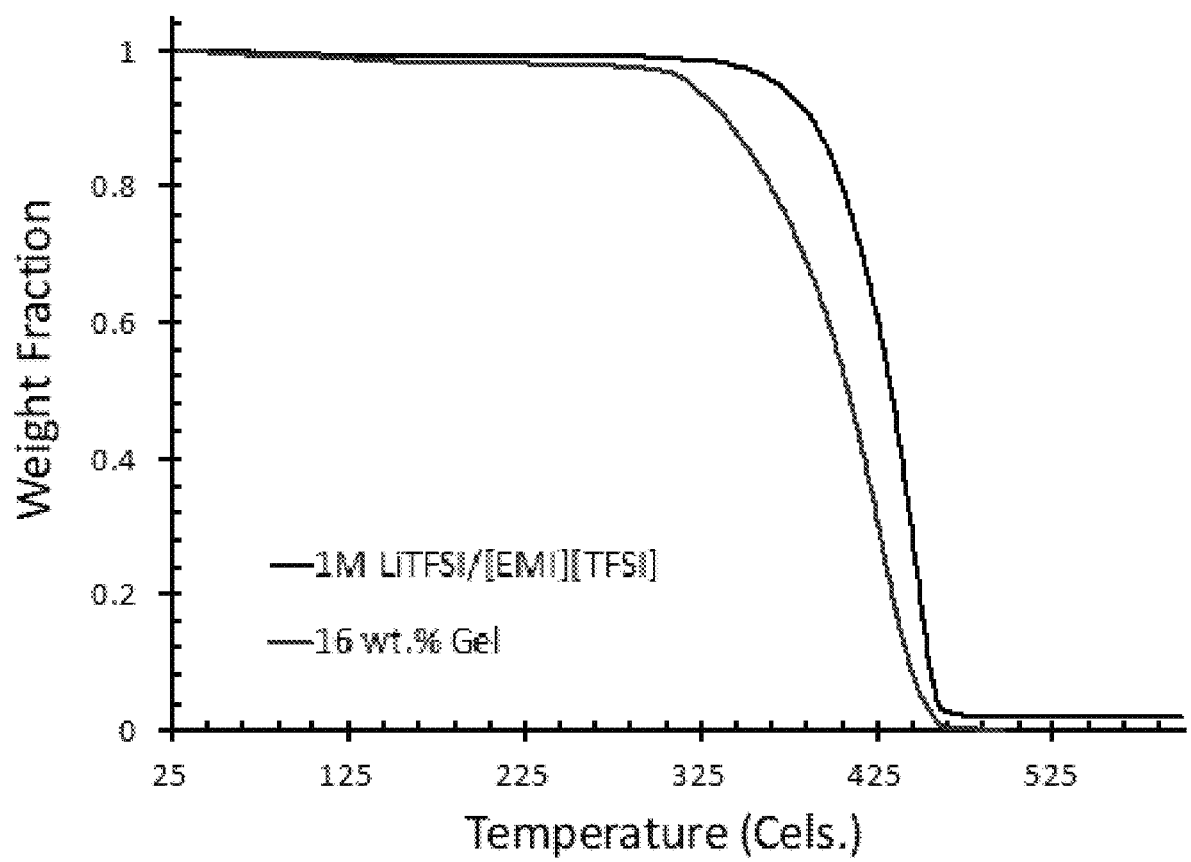
FIG. 5 is a plot of thermogravimetric analysis data obtained at a heating rate of 5° C./min comparing neat LiTFSI/EMI-TFSI (1 M) liquid electrolyte to a gel electrolyte composite formed from SBVI/MPC (1:3 mol ratio) and containing 20.1 mol % (or 16 wt %) of zwitterions relative to the total content of the gel electrolyte composite.

FIG. 5 depicts the thermal stability of a gel electrolyte composite containing 20.1 mol % (or 16 wt %) of zwitterions relative to the total content of the gel electrolyte composite, as compared to the neat LiTFSI/EMI-TFSI (1 M) liquid electrolyte. It was observed that the zwitterion-containing gel electrolyte composite remained stable up to 300° C. before substantial loss was detected; whereas, the neat liquid electrolyte not containing zwitterions remained stable up to 330° C.

These results indicate that a gel electrolyte composite of this invention exhibits high mechanical integrity and adequate ionic conductivity at various temperatures while showing high thermal stability.

Example 3

Gel Electrolyte Composites Formed from a Non-Lithium-Containing Ionic Liquid and Zwitterionic Monomers SBVI and MPC The preparation method described above was used to produce gel electrolyte composites using the non-lithium-containing ionic liquid EMI-TFSI and zwitterionic polymeric scaffolds formed from zwitterionic monomers SBVI and MPC at a range of molar ratios. UV-initiated free radical polymerization was carried out in the presence of the photoinitiator 2-hydroxy-2-methylpropiophenone.

Gel electrolyte composites were prepared with a range of SBVI from 20 mol % (0% MPC) of total polymer scaffold to 0 mol % (20 mol % MPC). Room-temperature ionic conductivities and elastic moduli were measured for SBVI: MPC zwitterionic polymeric scaffolds having varying polymer contents. The results are shown below in Table 3.

TABLE 3

Properties of 20 mol % SBVI:MPC zwitterionic polymeric scaffolds

| mole fraction MPC in SBVI:MPC copolymer | RT ionic conductivity (mS/cm) | Elastic modulus (kPa) |
|---|---|---|
| 0 | 6.7 | 1360 |
| 0.11 | 6.43 | 1570 |
| 0.2 | 5.58 | 6810 |
| 0.335 | 4.5 | 11600 |
| 0.5 | 4.1 | 4670 |
| 0.65 | 3.9 | 386 |
| 0.8 | 2.96 | 48 |
| 0.89 | 2.88 | 23 |
| 1 | 2.55 | N.D.[a] |

[a] = not determined

Ionogel room-temperature ionic conductivities were found to vary between 2.5 and 6.7 mS cm$^{-1}$ at a fixed total polymer content of 20 mol %. Compressive elastic moduli also exhibited a strong dependence on the co-monomer ratio, with values between 23 kPa and 11 MPa observed due to different degrees of ZI physical crosslinking. Note that 20 mol % MPC (no SBVI) did not form a free-standing gel. As such, no compressive elastic modulus was measured for that sample.

The largest elastic modulus of ~11 MPa for a 20 mol % fully-zwitterionic polymer-supported ionogel was observed when the two zwitterionic groups were combined at a 2:1 molar ratio of SBVI:MPC.

Figure 6:
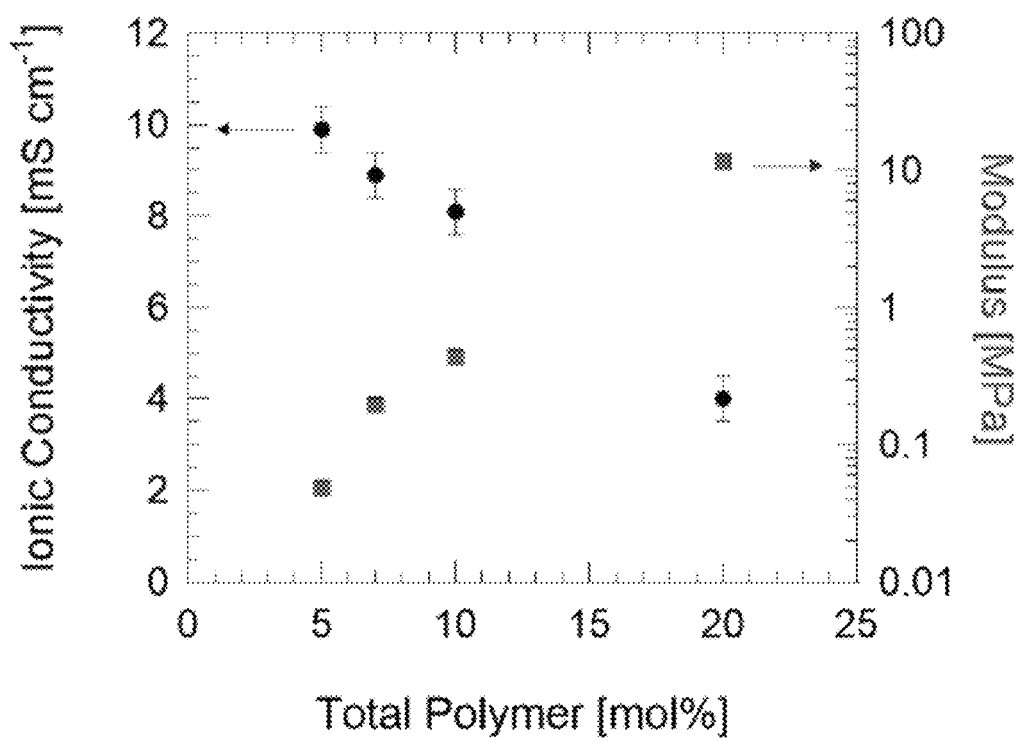
FIG. 6 is a plot of ionic conductivity and compressive elastic modulus versus mol % of an SBVI:MPC copolymer (2:1 molar ratio SBVI:MPC) in EMI-TFSI.

Further studies were performed to determine the dependence of total SBVI:MPC polymer content on ionic conductivity and elastic compressive modulus. Room-temperature ionic conductivity and elastic compressive modulus values were measured for SBVI:MPC (2:1 SVBVI:MPC molar ratio) in EMI-TFSI with a polymer content ranging from 5 mol % to 20 mol %. The results, shown in FIG. 6, demonstrated an inverse relationship between ionic conductivity and compressive elastic modulus of gel composites with increasing polymer content.

The temperature dependence of ionic conductivity was measured for neat EMI TFSI, as well as ionogels containing either poly(SBVI), poly(SBVI-co-MPC) formed using a 1:1 molar ratio of SBVI:MPC, or poly(MPC), all having 20 mol % total polymer scaffold. The ionogels were stable against thermal degradation up to 250° C. as determined by thermogravimetric analysis, although some ionic liquid was observed to leak out of the poly(SBVI)-supported ionogel when heated above 100° C.

Ionic conductivity measurements were obtained for each sample over a temperature range of 23-60° C. Activation energies of ionic conductivity were calculated from Arrhenius plots of the measurements. Neat EMI TFSI exhibited a conductivity activation energy of 13.0±0.6 kJ mol$^{-1}$. The activation energies were larger for all three 20 mol % polymer-containing samples. The poly(SBVI) ionogel and the poly(SBVI-co-MPC) ionogel had an activation energy of 14.8±0.6 kJ mol$^{-1}$ and 16.7±0.6 kJ mol$^{-1}$, respectively. The largest activation energy of ionic conductivity of 17.8±0.6 kJ mol$^{-1}$ was observed for the poly(MPC)-containing sample.

Example 4

Gel Electrolyte Composites Formed from a Sodium-Containing Ionic Liquid and Zwitterionic Monomers SBVI and MPC The preparation method described above was used to produce gel electrolyte composites using the sodium-containing ionic liquid NaTFSI-BMP TFSI and zwitterionic polymeric scaffolds formed from zwitterionic monomers SBVI and MPC at a range of molar ratios.

An exemplary gel electrolyte containing 13 wt. % fully-zwitterionic copolymer scaffold (1:3 molar ratio of SBVI: MPC) demonstrated a room temperature ionic conductivity of 1.01 mS/cm, while that of the liquid electrolyte itself was 1.25 mS/cm.

Figure 7:
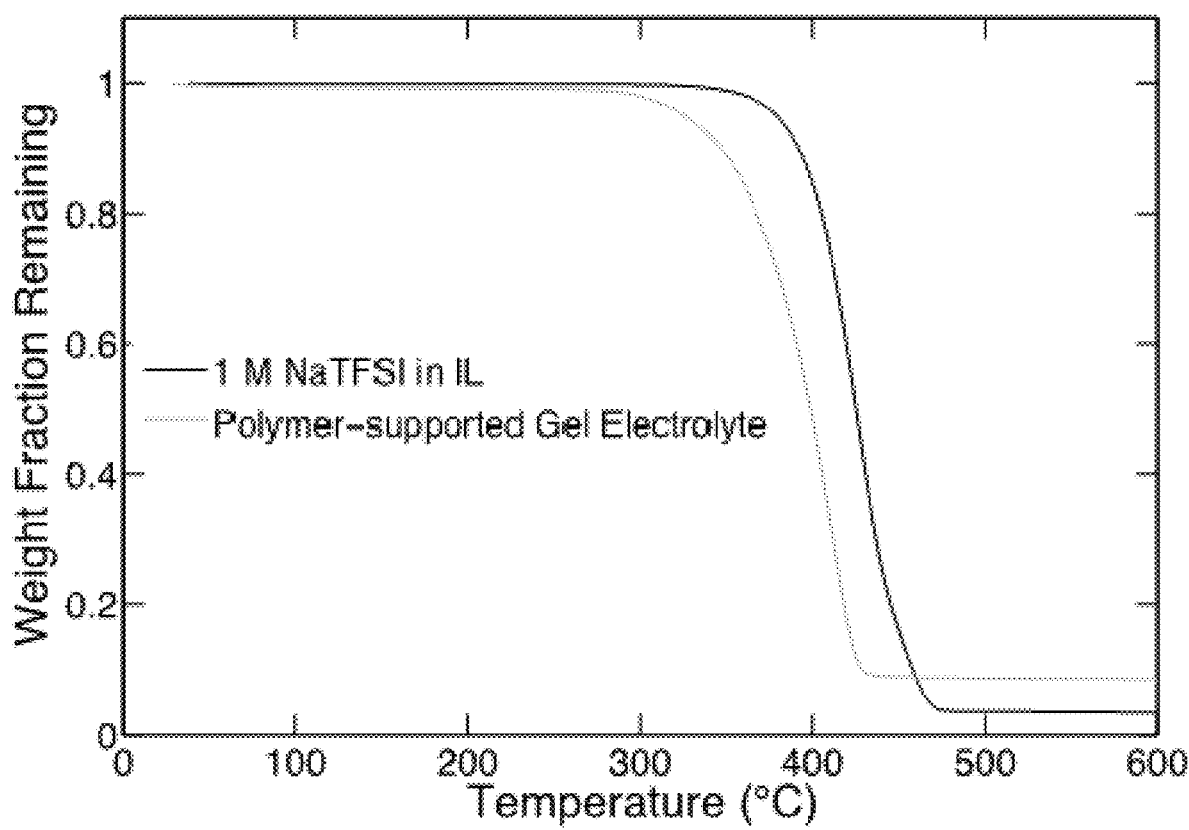
FIG. 7 is a plot of thermogravimetric analysis data obtained at a heating rate of 5° C./min comparing neat NaTFSI/N-methyl-N-butylpyrrolidinium (BMP)-TFSI (1 M) liquid electrolyte to a gel containing 13 wt % fully-zwitterionic SBVI:MPC (1:3 molar ratio) copolymer scaffold.

Thermogravimetric analysis was performed on two samples, i.e., the gel electrolyte described in the preceding paragraph and the nonvolatile liquid electrolyte. The results are shown in FIG. 7. Both samples showed excellent thermal stability compared to conventional organic liquid-based electrolytes.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A gel electrolyte composite comprising:
a nonvolatile electrolyte, and
a zwitterionic polymer scaffold,
wherein the nonvolatile electrolyte comprises Li(G4)-TFSI, a mixture of LiTFSI and EMI-TFSI, EMI-TFSI, or a mixture of NaTFSI and BMP-TFSI;
the zwitterionic polymer scaffold comprises a polymer formed from a molar ratio of:
a) about 1:1 or about 1:3 of sulfobetaine vinylimidazole (SBVI) and 2-methacryloyloxyethyl phosphorylcholine (MPC); or
b) about 1:5 of sulfobetaine methacrylate (SBMA) and MPC.

2. The gel electrolyte composite of claim 1, wherein the zwitterionic polymer scaffold contains 10 mol % or higher of zwitterions relative to the total content of the gel electrolyte composite.

3. The gel electrolyte composite of claim 1, wherein the zwitterionic polymer scaffold contains 20 mol % or higher of zwitterions relative to the total content of the gel electrolyte composite.

4. The gel electrolyte composite of claim 1, wherein the nonvolatile electrolyte constitutes 1-99 vol % of the gel electrolyte composite and the zwitterionic polymer scaffold constitutes 1-99 vol % of the gel electrolyte composite.

5. The gel electrolyte composite of claim 1, wherein the nonvolatile electrolyte constitutes 50-99 vol % of the gel electrolyte composite and the zwitterionic polymer scaffold constitutes 1-50 vol % of the gel electrolyte composite.

6. The gel electrolyte composite of claim 1, wherein the nonvolatile electrolyte constitutes 60-95 vol % of the gel electrolyte composite and the zwitterionic polymer scaffold constitutes 5-40 vol % of the gel electrolyte composite.

7. The gel electrolyte composite of claim 1, wherein the nonvolatile electrolyte comprises Li(G4)-TFSI or the mixture of LiTFSI and EMI-TFSI; and the zwitterionic polymer scaffold contains 1 mol % or higher of zwitterions relative to the total content of the gel electrolyte composite.

8. The gel electrolyte composite of claim 1, wherein the nonvolatile electrolyte does not comprise Li(G4)-TFSI or the mixture of LiTFSI and EMI-TFSI; and the zwitterionic polymer scaffold contains 8 mol % or higher of zwitterions relative to the total content of the gel electrolyte composite.

9. The gel electrolyte composite of claim 1, wherein the nonvolatile electrolyte comprises Li(G4)-TFSI.

10. The gel electrolyte composite of claim 1, wherein the nonvolatile electrolyte comprises EMI-TFSI.

11. The gel electrolyte composite of claim 1, wherein the nonvolatile electrolyte comprises the mixture of LiTFSI and EMI-TFSI.

12. The gel electrolyte composite of claim 1, wherein the nonvolatile electrolyte comprises the mixture of NaTFSI and BMP-TFSI.

13. The gel electrolyte composite of claim 1, wherein the zwitterionic polymer scaffold is formed from the molar ratio of about 1:5 of SBMA and MPC.

14. The gel electrolyte composite of claim 1, wherein the zwitterionic polymer scaffold is formed from the molar ratio of about 1:1 of SBVI and MPC.

15. The gel electrolyte composite of claim 1, wherein the zwitterionic polymer scaffold is formed from the molar ratio of about 1:3 of SBVI and MPC.

16. An electrochemical energy storage device, comprising the gel electrolyte composite of claim 1, wherein the nonvolatile electrolyte constitutes 50-99 vol % of the gel electrolyte composite and the zwitterionic polymer scaffold constitutes 1-50 vol % of the gel electrolyte composite.

17. The electrochemical energy storage device of claim 16, wherein the storage device is a lithium-ion battery, a lithium metal battery, a sodium-ion battery, or a supercapacitor.

18. The electrochemical energy storage device of claim 17, wherein the storage device is a sodium-ion battery.

* * * * *